(12) United States Patent
   Arai

(10) Patent No.: US 11,080,030 B2
(45) Date of Patent: Aug. 3, 2021

(54) INFORMATION PROCESSING APPARATUS AND INFORMATION PROCESSING METHOD

(71) Applicant: FUJITSU LIMITED, Kawasaki (JP)

(72) Inventor: Masaki Arai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/902,331

(22) Filed: Jun. 16, 2020

(65) Prior Publication Data

US 2021/0019128 A1    Jan. 21, 2021

(30) Foreign Application Priority Data

Jul. 19, 2019    (JP) .............................. JP2019-133669

(51) Int. Cl.
  *G06F 8/41*    (2018.01)

(52) U.S. Cl.
  CPC .................. *G06F 8/4442* (2013.01)

(58) Field of Classification Search
  CPC ........... G06F 8/4442; G06F 8/41; G06F 8/443
  See application file for complete search history.

(56) References Cited

U.S. PATENT DOCUMENTS

| | | | | |
|---|---|---|---|---|
| 5,903,915 A | * | 5/1999 | Inman ................. | G06F 12/0802 711/167 |
| 2005/0081019 A1 | * | 4/2005 | DeWitt, Jr. ......... | G06F 9/30181 712/227 |
| 2008/0250401 A1 | * | 10/2008 | Puri ........................ | G06F 8/433 717/160 |
| 2010/0088673 A1 | * | 4/2010 | Chen ..................... | G06F 8/4442 717/110 |
| 2014/0359214 A1 | | 12/2014 | Arai | |
| 2015/0212804 A1 | * | 7/2015 | Arai ......................... | G06F 8/40 717/124 |
| 2015/0277876 A1 | * | 10/2015 | Yamanaka .............. | G06F 8/443 717/152 |
| 2017/0357601 A1 | * | 12/2017 | Arai ....................... | G06F 11/34 |

FOREIGN PATENT DOCUMENTS

| | | |
|---|---|---|
| JP | 2007-272681 A | 10/2007 |
| JP | 2011-170439 A | 9/2011 |
| JP | 2014-232369 A | 12/2014 |

OTHER PUBLICATIONS

Extended European Search Report dated Nov. 25, 2020 for corresponding European Patent Application No. 20178075.6, 7 pages.

* cited by examiner

*Primary Examiner* — Marina Lee
(74) *Attorney, Agent, or Firm* — Fujitsu Patent Center

(57) ABSTRACT

An information processing apparatus includes: a memory; and a processor coupled to the memory and configured to: receive input of an input program in which a plurality of statements is written in a loop; generate a counting program for causing a computing machinery to execute a process of counting the number of cache misses and the number of cache hits that are expected when the loop is executed for each of pairs of the statements by rewriting the input program; and split the loop into a plurality of loops based on the number of cache misses and the number of cache hits counted in the process.

6 Claims, 22 Drawing Sheets

FIG. 7

| TYPE OF DATA | VALUE |
|---|---|
| START ADDRESS OF ARRAY A | 0 |
| NUMBER OF BYTES PER ARRAY ELEMENT OF ARRAY A | 8 |
| DIMENSION INFORMATION OF ARRAY A | 100 |
| START ADDRESS OF ARRAY B | 800 |
| NUMBER OF BYTES PER ARRAY ELEMENT OF ARRAY B | 8 |
| DIMENSION INFORMATION OF ARRAY B | 100 |
| START ADDRESS OF ARRAY C | 1600 |
| NUMBER OF BYTES PER ARRAY ELEMENT OF ARRAY C | 8 |
| DIMENSION INFORMATION OF ARRAY C | 100 |

| NUMBER | ORDERED PAIR |
|---|---|
| 1 | (S1, S2) |
| 2 | (S1, S3) |
| 3 | (S2, S3) |
| 4 | (S3, S2) |

| VARIABLE | DATA |
|----------|------|
| N | 1000 |

| TYPE OF DATA | VALUE |
|---|---|
| ASSOCIATIVITY A OF CACHE | 2 |
| BLOCK SIZE B OF CACHE | 32 |
| NUMBER S OF SETS OF CACHE | 4 |

| IDENTIFIER | COMPONENT ELEMENT |
|:---:|:---:|
| E1 | for (i = 0; i < N; i++) { |
| E2 | S1:  A[i] = X[i]; |
| E3 | S2:  B[i] = A[i] / X[i + 4]; |
| E4 | S3:  C[i] = A[i] * X[i + 8]; |
| E5 | } |

FIG. 15

```
ACCESS_QUEUE (cache1, 0, s, adress(X[i]));   /* S1 */
ACCESS_QUEUE (cache1, 0, s, adress(A[i]));   /* S1 */
ACCESS_QUEUE (cache2, 0, s, adress(X[i]));   /* S1 */
ACCESS_QUEUE (cache2, 0, s, adress(A[i]));   /* S1 */
```

FIG. 16

```
ACCESS_QUEUE (cache1, 1, s, adress(A[i]));    /* S2 */
ACCESS_QUEUE (cache1, 1, s, adress(X[i+4]));  /* S2 */
ACCESS_QUEUE (cache1, 1, s, adress(B[i]));    /* S2 */
ACCESS_QUEUE (cache3, 0, s, adress(A[i]));    /* S2 */
ACCESS_QUEUE (cache3, 0, s, adress(X[i+4]));  /* S2 */
ACCESS_QUEUE (cache3, 0, s, adress(B[i]));    /* S2 */
ACCESS_QUEUE (cache4, 1, s, adress(A[i]));    /* S2 */
ACCESS_QUEUE (cache4, 1, s, adress(X[i+4]));  /* S2 */
ACCESS_QUEUE (cache4, 1, s, adress(B[i]));    /* S2 */
```

FIG. 17

```
ACCESS_QUEUE (cache2, 1, s, adress(A[i]));      /* S3 */
ACCESS_QUEUE (cache2, 1, s, adress(X[i+8]));    /* S3 */
ACCESS_QUEUE (cache2, 1, s, adress(C[i]));      /* S3 */
ACCESS_QUEUE (cache3, 1, s, adress(A[i]));      /* S3 */
ACCESS_QUEUE (cache3, 1, s, adress(X[i+8]));    /* S3 */
ACCESS_QUEUE (cache3, 1, s, adress(C[i]));      /* S3 */
ACCESS_QUEUE (cache4, 0, s, adress(A[i]));      /* S3 */
ACCESS_QUEUE (cache4, 0, s, adress(X[i+8]));    /* S3 */
ACCESS_QUEUE (cache4, 0, s, adress(C[i]));      /* S3 */
```

FIG. 18

```
DUMP (cache1, s);
DUMP (cache2, s);
DUMP (cache3, s);
DUMP (cache4, s);
```

FIG. 19

```
E1----- for (i = 1; i < N; i++) {
            ACCESS_QUEUE (cache1, 0, s, adress(X[i]));      /* S1 */
            ACCESS_QUEUE (cache1, 0, s, adress(A[i]));      /* S1 */
            ACCESS_QUEUE (cache2, 0, s, adress(X[i]));      /* S1 */
            ACCESS_QUEUE (cache2, 0, s, adress(A[i]));      /* S1 */

ACCESS_QUEUE (cache1, 1, s, adress(A[i]));      /* S2 */
            ACCESS_QUEUE (cache1, 1, s, adress(X[i+4]));    /* S2 */
            ACCESS_QUEUE (cache1, 1, s, adress(B[i]));      /* S2 */
            ACCESS_QUEUE (cache3, 0, s, adress(A[i]));      /* S2 */
            ACCESS_QUEUE (cache3, 0, s, adress(X[i+4]));    /* S2 */
            ACCESS_QUEUE (cache3, 0, s, adress(B[i]));      /* S2 */
            ACCESS_QUEUE (cache4, 1, s, adress(A[i]));      /* S2 */
            ACCESS_QUEUE (cache4, 1, s, adress(X[i+4]));    /* S2 */
            ACCESS_QUEUE (cache4, 1, s, adress(B[i]));      /* S2 */

ACCESS_QUEUE (cache2, 1, s, adress(A[i]));      /* S3 */
            ACCESS_QUEUE (cache2, 1, s, adress(X[i+8]));    /* S3 */
            ACCESS_QUEUE (cache2, 1, s, adress(C[i]));      /* S3 */
            ACCESS_QUEUE (cache3, 1, s, adress(A[i]));      /* S3 */
            ACCESS_QUEUE (cache3, 1, s, adress(X[i+8]));    /* S3 */
            ACCESS_QUEUE (cache3, 1, s, adress(C[i]));      /* S3 */
            ACCESS_QUEUE (cache4, 0, s, adress(A[i]));      /* S3 */
            ACCESS_QUEUE (cache4, 0, s, adress(X[i+8]));    /* S3 */
            ACCESS_QUEUE (cache4, 0, s, adress(C[i]));      /* S3 */
E5----- }

DUMP (cache1, s);
         DUMP (cache2, s);
         DUMP (cache3, s);
         DUMP (cache4, s);
```

```
for (i = 1; i < N; i++) {
    ACCESS (cache1, s, adress(X[i]));      /* S1 */
    ACCESS (cache1, s, adress(A[i]));      /* S1 */
60a ACCESS (cache1, s, adress(A[i]));      /* S2 */
    ACCESS (cache1, s, adress(X[i+4]));    /* S2 */
    ACCESS (cache1, s, adress(B[i]));      /* S2 */

ACCESS (cache2, s, adress(X[i]));      /* S1 */
    ACCESS (cache2, s, adress(A[i]));      /* S1 */
60b ACCESS (cache2, s, adress(A[i]));      /* S3 */
    ACCESS (cache2, s, adress(X[i+8]));    /* S3 */
    ACCESS (cache2, s, adress(C[i]));      /* S3 */

ACCESS (cache3, s, adress(A[i]));      /* S2 */
    ACCESS (cache3, s, adress(X[i+4]));    /* S2 */
    ACCESS (cache3, s, adress(B[i]));      /* S2 */
60c ACCESS (cache3, s, adress(A[i]));      /* S3 */
    ACCESS (cache3, s, adress(X[i+8]));    /* S3 */
    ACCESS (cache3, s, adress(C[i]));      /* S3 */

ACCESS (cache4, s, adress(A[i]));      /* S3 */
    ACCESS (cache4, s, adress(X[i+8]));    /* S3 */
60d ACCESS (cache4, s, adress(C[i]));      /* S3 */
    ACCESS (cache4, s, adress(A[i]));      /* S2 */
    ACCESS (cache4, s, adress(X[i+4]));    /* S2 */
    ACCESS (cache4, s, adress(B[i]));      /* S2 */
}

DUMP (cache1, s);
DUMP (cache2, s);
DUMP (cache3, s);
DUMP (cache4, s);
```

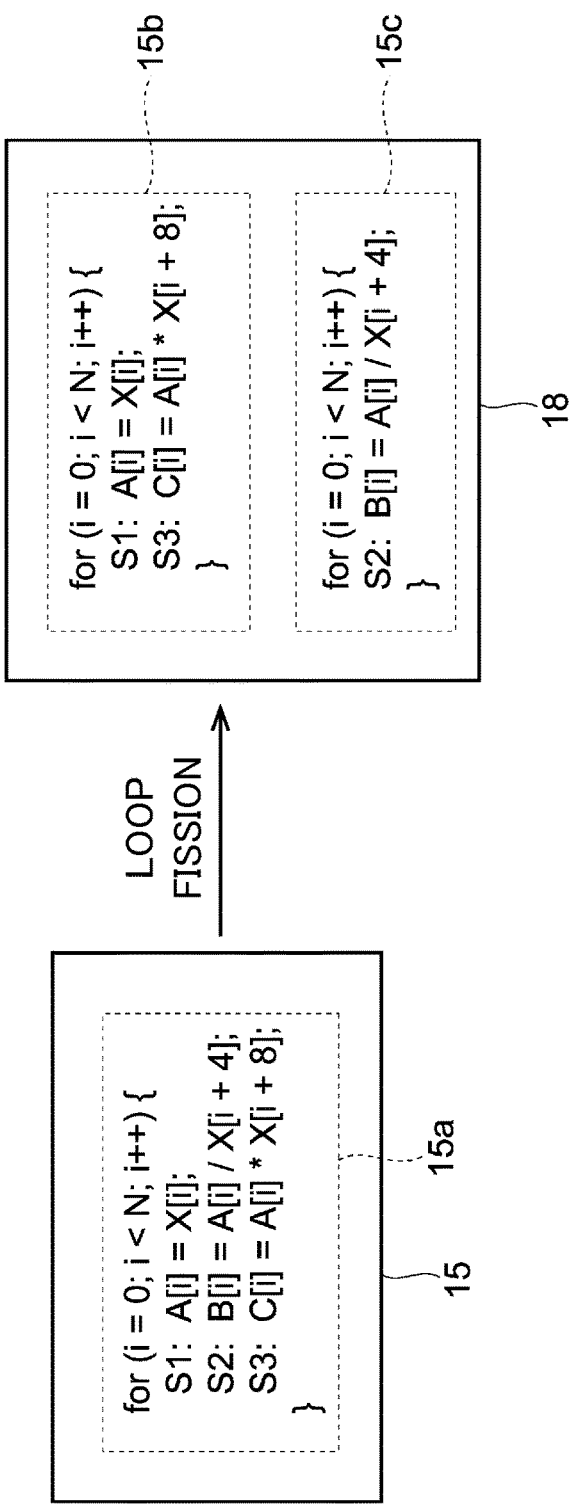

INFORMATION PROCESSING APPARATUS AND INFORMATION PROCESSING METHOD

CROSS-REFERENCE TO RELATED APPLICATION

This application is based upon and claims the benefit of priority of the prior Japanese Patent Application No. 2019-133669, filed on Jul. 19, 2019, the entire contents of which are incorporated herein by reference.

FIELD

A certain aspect of embodiments described herein relates to an information processing apparatus and an information processing method.

BACKGROUND

Loop fission is one of the techniques for executing an application program while efficiently using the hardware resource of a computing machinery. The loop fission reduces the number of statements included in one loop by splitting a loop of the application program into two or more loops, thereby, reducing cache misses. The reduction of cache misses reduces the replacement of data in the cache memory, which results in efficient use of the cache memory, which is one of hardware devices.

However, there are many methods for loop fission of the application program, and it is not easy to find a fission method that can reduce cache misses among the many fission methods. Note that the techniques related to the present disclosure is also disclosed in Japanese Patent Application Publication No. 2014-232369.

SUMMARY

According to an aspect of the embodiments, there is provided an information processing apparatus including: a memory; and a processor coupled to the memory and configured to: receive input of an input program in which a plurality of statements is written in a loop; generate a counting program for causing a computing machinery to execute a process of counting the number of cache misses and the number of cache hits that are expected when the loop is executed for each of pairs of the statements by rewriting the input program; and split the loop into a plurality of loops based on the number of cache misses and the number of cache hits counted in the process.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 7 illustrates an example of program information in accordance with the embodiment;

FIG. 8 illustrates an example of pair information in accordance with the embodiment;

FIG. 9 illustrates variable and array information in accordance with the embodiment;

FIG. 10 illustrates an example of cache configuration information in accordance with the embodiment;

FIG. 14 is a schematic diagram illustrating component elements E1 to E5 in the embodiment;

FIG. 15 is a schematic diagram illustrating functions ACCESS_QUEUE generated when a statement S1, which is the component element E2, is processed in step P18 of FIG. 13;

FIG. 16 is a schematic diagram illustrating the functions ACCESS_QUEUE generated when a statement S2, which is the component element E3, is processed in step P18 of FIG. 13;

FIG. 17 is a schematic diagram illustrating the functions ACCESS_QUEUE generated when a statement S3, which is the component element E4, is processed in step P18 of FIG. 13;

FIG. 18 is a schematic diagram illustrating an example of a code output in step P19 of FIG. 13;

FIG. 19 is a schematic diagram illustrating an example of a profile information generating program in accordance with the embodiment;

FIG. 20 illustrates an example of an equivalent program in accordance with the embodiment;

FIG. 22A illustrates the profile information for describing another example of the loop fission in the embodiment, and FIG. 22B illustrates an example of an output program obtained by the fission unit performing the loop fission.

DESCRIPTION OF EMBODIMENTS

The present embodiment performs loop fission on an application program to be executed in a target machine in the manner described below, thereby reducing cache misses occurring in the target machine.

Target Machine

Figure 1:
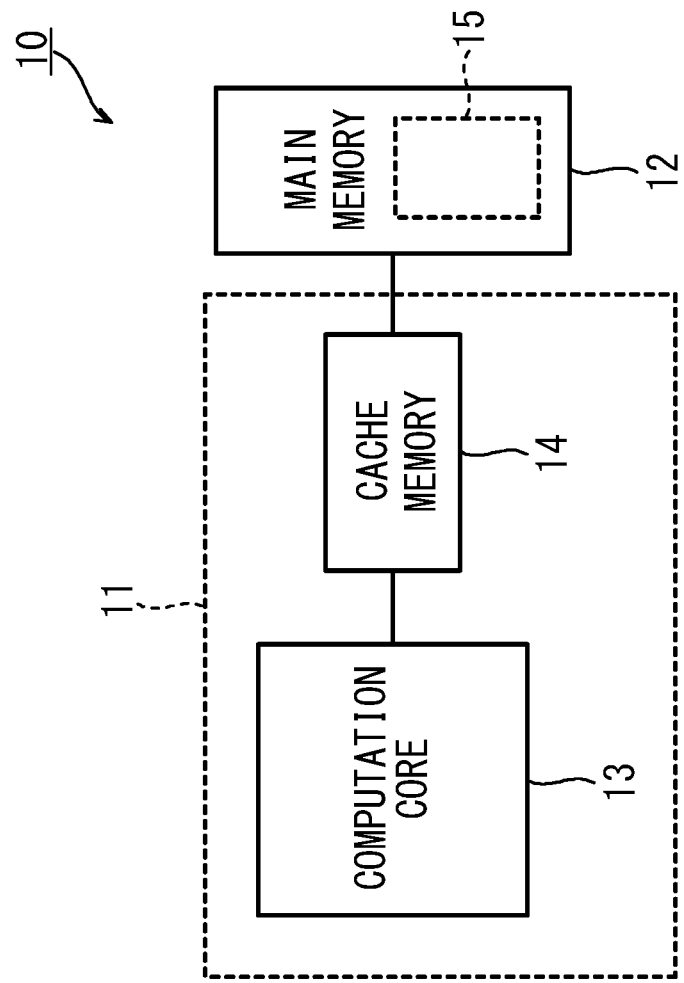
FIG. 1 is a hardware configuration diagram of a target machine.

FIG. 1 is a hardware configuration diagram of a target machine 10. The target machine 10 is a parallel computing machinery for high performance computing (HPC) or a personal computer (PC), and includes a processor 11 and a main memory 12.

The processor 11 is a hardware device configured to perform various computations, and includes a computation core 13 and a cache memory 14.

The computation core 13 is a circuit element including an arithmetic logic unit (ALU), which performs arithmetic operations and logical operations, and various registers. The cache memory 14 is a memory such as a static random access memory (SRAM) holding data to be used in the computation core 13.

The main memory 12 is a hardware device such as a dynamic random access memory (DRAM) that stores an application program 15 to be executed in the computation core 13. The application program 15 is an example of an input program, and is a program to be subject to loop fission.

In such a target machine 10, data that is referenced at the time of execution by each instruction included in the application program 15 is stored in the cache memory 14. When the data referenced by each instruction is found in the cache memory 14, it is said that a cache hit occurs.

When a cache hit occurs, each instruction can reference data by accessing the cache memory 14. Thus, each instruction does not need to access the main memory 12, and the time required for memory access is reduced.

The number of times that the cache hit occurs from the start to the end of the execution of the application program 15 is called the number of cache hits. The larger number of cache hits indicates that the hardware resource such as the cache memory 14 is more efficiently used during the execution of the application program 15.

On the other hand, when the data referenced by the instruction is not found in the cache memory 14, it is said that a cache miss occurs. There are two types of cache misses: a compulsory miss and a replacement miss. The compulsory miss occurs when the cache memory 14 is empty before execution of the application program 15. The replacement miss occurs when data is once stored in the cache memory 14 but the data is evicted from the cache memory 14 by the subsequent instruction. The occurrence of either of the cache misses causes the access to the main memory 12 for referencing the data, which results in the prolongation of the execution time of the application program 15.

The number of times that cache misses including the compulsory miss and the replacement miss occurs from the start to the end of the execution of the application program 15 is called the number of cache misses.

The number of cache misses can be reduced by splitting the loop written in the application program 15 to reduce the number of memory reference instructions included in one loop.

The application program 15 is not particularly limited. However, to efficiently reduce the cache misses by loop fission, a program for HPC in which the execution of one loop causes the execution of many memory reference instructions is preferably employed as the application program 15. When the application program 15 in which hundreds to thousands of statements are written in one loop is executed, the large part of the execution time is spent in processing the loop. Such a loop is also called a kernel loop. Significant reduction in cache misses is expected by loop fission of the application program 15 in which the kernel loop is written.

The method of storing data in the cache memory 14 is not particularly limited, but in this example, data is stored in the cache memory 14 using the set-associative technique.

Figure 2A:
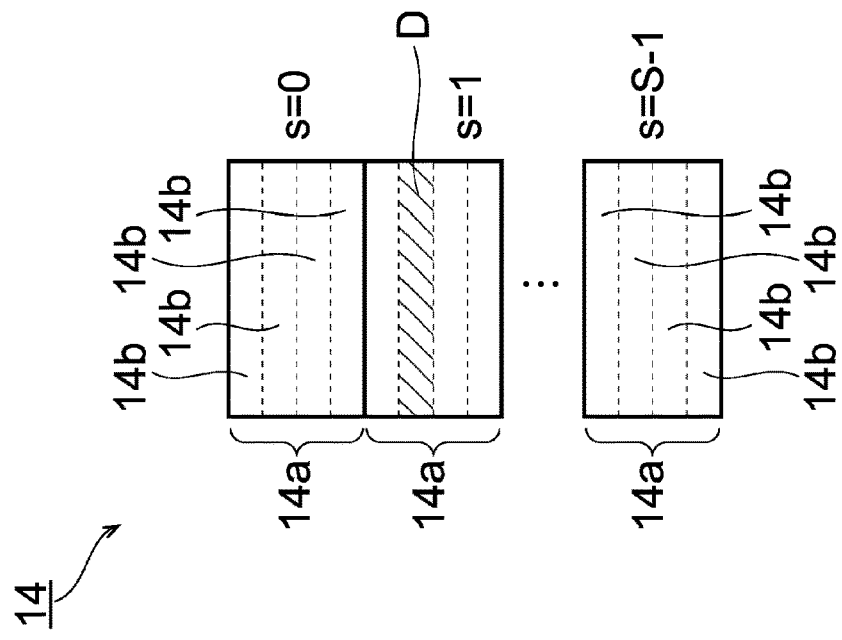
FIG. 2A is a schematic diagram for describing a set-associative technique.

FIG. 2A is a schematic diagram for describing the set-associative technique.

As illustrated in FIG. 2A, in the set-associative technique, the cache memory 14 is divided into a plurality of sets 14a.

A set identifier, s, is allocated to each of these sets 14a, and thereby, each set 14a can be uniquely identified by specifying the set identifier s.

Each set 14a includes a plurality of blocks 14b. The block 14b is a storage area for storing data. Hereinafter, the size of the storage area is called a block size B.

The number of the blocks 14b in one set 14a is called an associativity A. In the example of FIG. 2A, the associativity is 4. The number S of sets, which is the total number of the sets 14a, is expressed by the following expression (1) with the associativity A.

$$S = \frac{C}{AB} \qquad (1)$$

Note that in the expression (1), C denotes the total size (byte) of the cache memory 14.

When the address of data D is denoted by m, the set identifier s of the set 14a in which the data D is to be stored is expressed by the following expression (2).

$$s = \left\lfloor \frac{m}{B} \right\rfloor \bmod S \qquad (2)$$

Accordingly, the set 14a in which the data D is to be stored can be identified by the address m of the data D. In addition, which block the data D is to be stored in among the plurality of blocks 14b included in the specified set 14a is determined according to the tag determined by the address m.

Figure 2B:
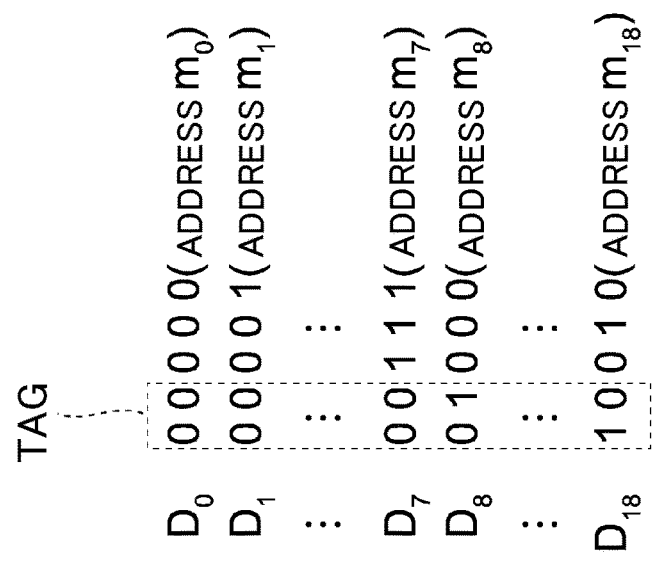
FIG. 2B is a schematic diagram for describing a tag.

FIG. 2B is a schematic diagram for describing the tag. Here, the method of determining the tag will be described using the addresses $m_0$ to $m_{18}$ of the data $D_0$ to $D_{18}$ as an example.

When the associativity A is $2^n$, the tag is defined by high n bits of the addresses $m_0$ to $m_{18}$. For example, when the associativity A is 2, the tag of the address mg expressed by "01000" is "01". The tag in this case is one of "00", "01", "10", and "11". The block 14b in which the data with the address m is to be stored can be determined by associating these tags to the four blocks 14b in one set 14a.

Next, the method of splitting a loop included in the application program 15 will be described.

Figure 3:
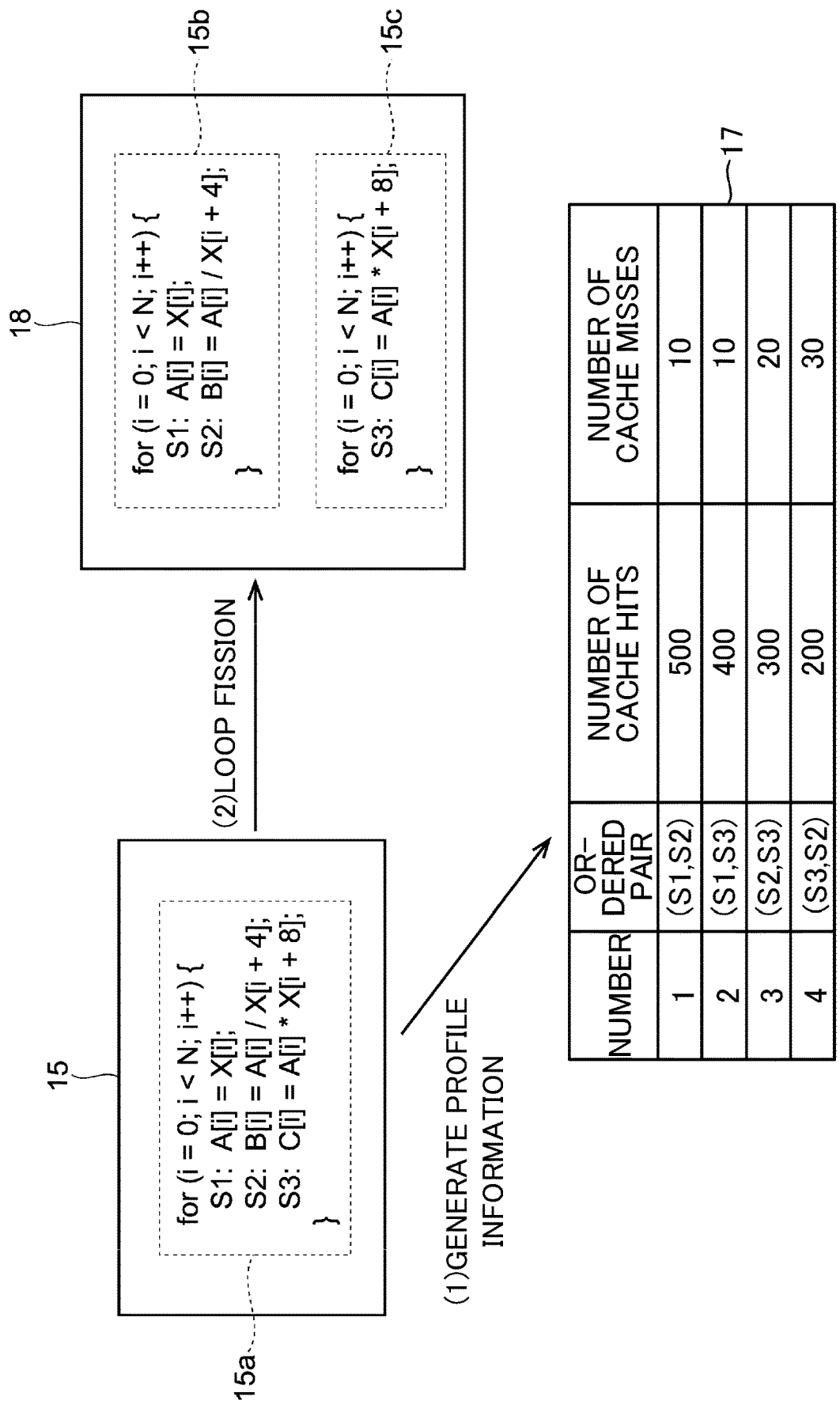
FIG. 3 is a schematic diagram for describing an overview of a method of loop fission in an embodiment.

FIG. 3 is a schematic diagram for describing an overview of the method of loop fission in the present embodiment.

In this example, it is assumed that the application program 15 is a source program written in programming language C, and a loop 15a using a for statement is written in the application program 15. A while statement may be used for the loop 15a. Furthermore, the application program 15 may be written in programming language C++ or Fortran.

Moreover, it is assumed that three statements S1, S2, and S3 are written in the loop 15a.

In this case, in the present embodiment, profile information 17 is generated based on the application program 15. The profile information 17 includes the number of cache hits and the number of cache misses that are expected when the program in which only two of the statements S1, S2, and S3 are written in the loop 15a is executed in the target machine 10.

In this example, two statements selected from among the statements S1, S2, and S3 are expressed by the ordered pair, and the ordered pair is associated with both the number of cache hits and the number of cache misses. The ordered pair is a pair including a first component that is the statement to be executed first and a second component that is the statement to be executed second when an output program 18 after loop fission is executed. Although there are such pairs, here, a pair having the execution result, when executed in the loop, identical to that in the application program 15 is defined as the ordered pair.

For example, in the example of FIG. 3, when the dependence relationships among the statements S1, S2, and S3 are ignored, six pairs: (S1, S2), (S2, S1), (S1, S3), (S3, S1), (S2, S3), and (S3, S2) are obtained. Among them, four pairs: (S1, S2), (S1, S3), (S2, S3), and (S3, S2) have the execution results, when executed in the loop, identical to those in the application program 15. Thus, these four pairs are included, as the ordered pairs, in the profile information 17.

The number for uniquely identifying each ordered pair is also included in the profile information 17.

According to the profile information 17 illustrated in FIG. 3, the number of cache hits of the ordered pair (S1, S2) is greatest. Thus, the cache hit rate is increased by writing only the statements S1 and S2 in one loop.

Thus, in the present embodiment, the loop 15a of the application program 15 is split into two loops 15b and 15c, and the output program 18 in which only the statements S1 and S2 are written in the loop 15b and the remaining statement S3 is written alone in the other loop 15c is generated.

Compared with the case where a pair of statements different from the pair of the statements S1 and S2 is written in the loop 15b, the cache hit rate when the output program 18 is executed in the target machine 10 can be increased.

Additionally, in the present embodiment, the profile information 17 is generated from the application program 15 as described later without executing the application program 15 on a CPU simulator for simulating the operation of the processor 11. Thus, compared with the case where the CPU simulator, which operates at a slower rate than the target machine 10, is used, the profile information 17 can be obtained fast.

The number of cache hits and the number of cache misses can be counted using the register built into the processor 11 of the target machine 10. However, in this case, although the number of cache hits and the number of cache misses when the entire of the application program 15 is executed can be counted, the number of cache hits and the number of cache misses for each ordered pair of the statements cannot be obtained as in the profile information 17.

Next, a description will be given of an information processing apparatus in accordance with the present embodiment that generates the profile information 17 and performs loop fission.

Hardware Configuration

Figure 4:
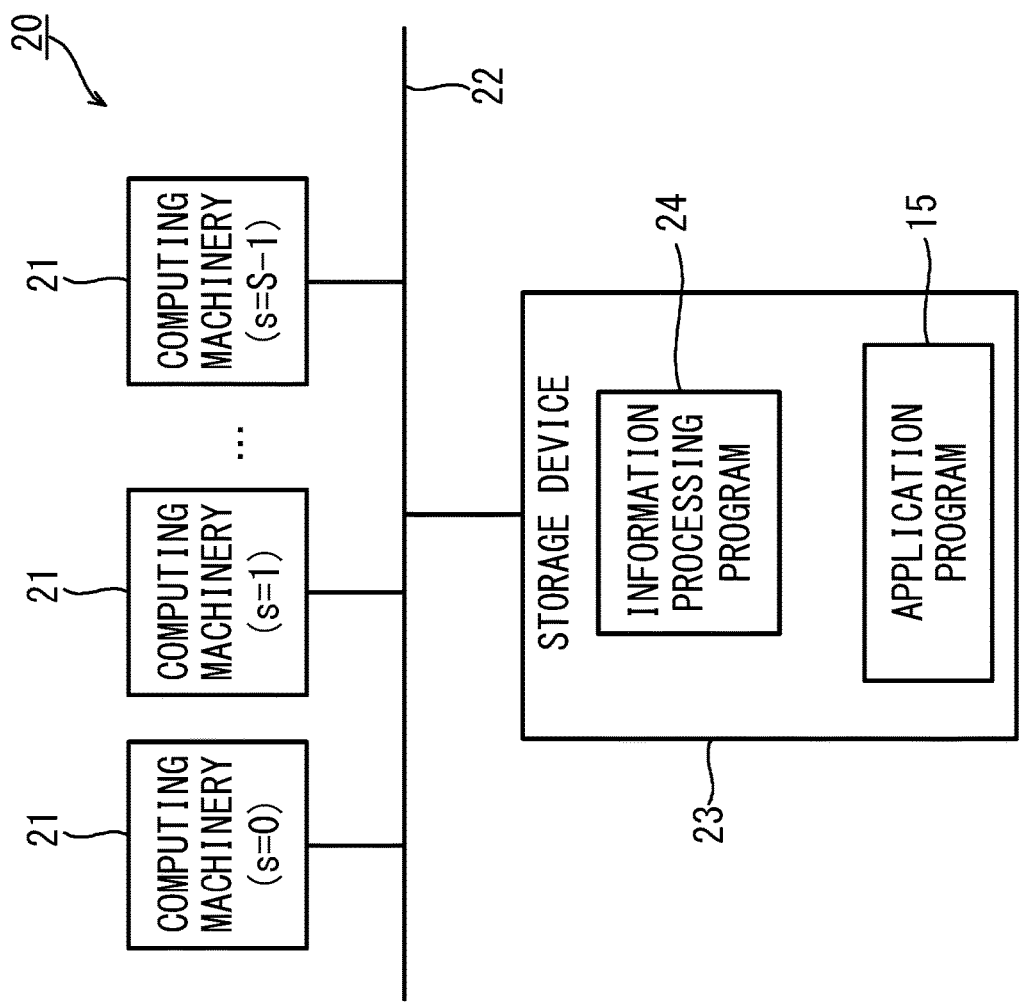
FIG. 4 is a hardware configuration diagram of an information processing apparatus in accordance with the embodiment.

FIG. 4 is a hardware configuration diagram of an information processing apparatus in accordance with the present embodiment.

An information processing apparatus 20 includes a plurality of computing machineries 21, a network 22 interconnecting the computing machineries 21, and a storage device 23 connected to the network 22. Each of the computing machineries 21 independently performs a computation.

The storage device 23 is a secondary storage device such as a hard disk drive (HDD) or a solid state drive (SSD), and stores the application program 15 and an information processing program 24. The information processing program 24 generates the profile information 17 based on the application program 15 and performs loop fission of the application program 15 based on the profile information 17.

The computing machinery 21 is for obtaining the profile information 17. In this example, a plurality of the computing machineries 21 corresponding to the respective set identifiers s of the cache memory 14 is prepared. Each computing machinery 21 generates the profile information 17 including the number of cache hits and the number of cache misses in the corresponding set identifier s. The profile information 17 can be generated fast by the computing machineries 21 individually performing computations in parallel in such a manner.

When the time for generating the profile information 17 does not matter, the profile information 17 for all the set identifiers s can be generated by one computing machinery 21.

Figure 5:
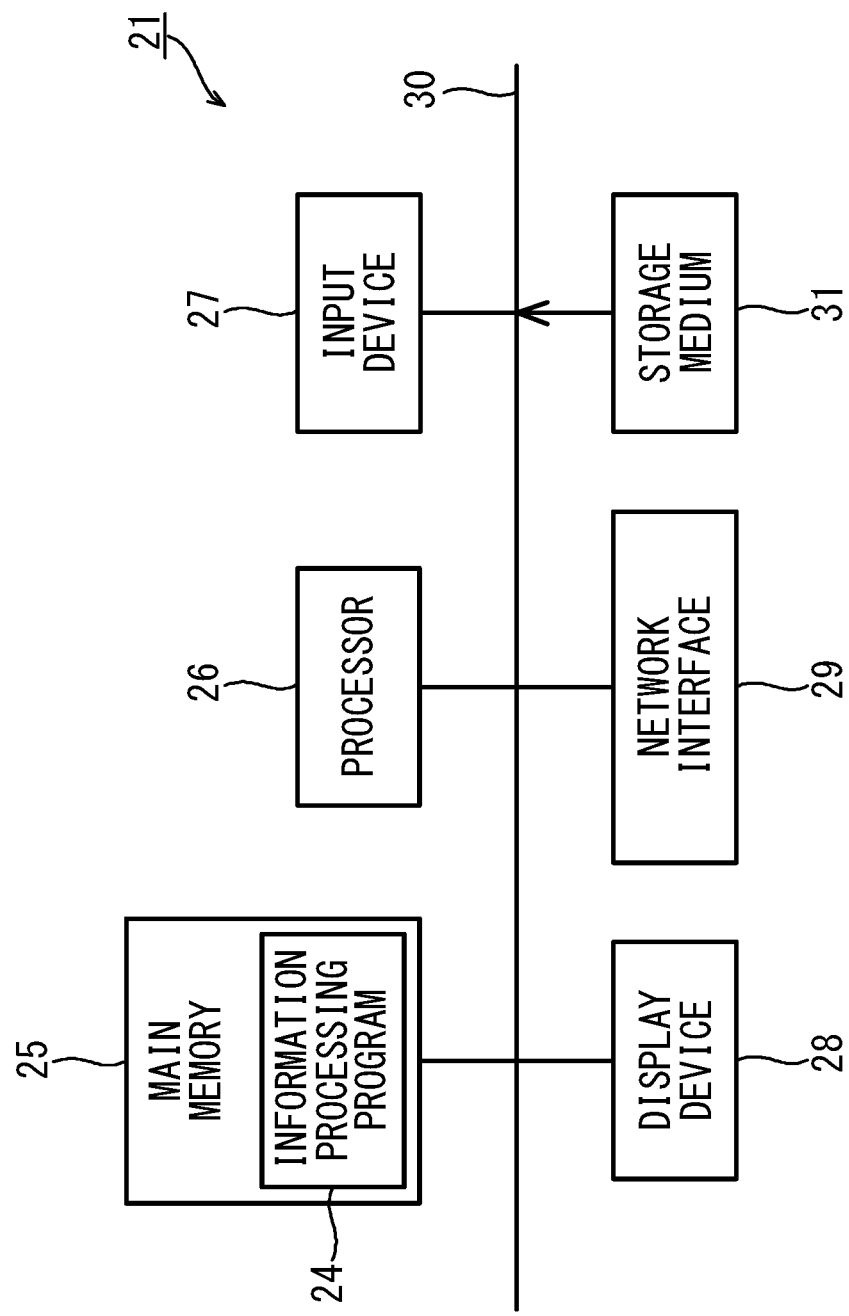
FIG. 5 is a hardware configuration diagram of a computing machinery.

FIG. 5 is a hardware configuration diagram of each computing machinery 21. The computing machinery 21 is, for example, a server or a PC, and includes a main memory 25, a processor 26, an input device 27, a display device 28, and a network interface 29. These components are interconnected through a bus 30.

The main memory 25 is a hardware device such as a DRAM that temporarily stores data. The information processing program 24 described above is loaded into the main memory 25.

The processor 26 is a hardware device such as a central processing unit (CPU) or a graphics processing unit (GPU) that controls each component of the computing machinery 21 and executes the information processing program 24 in cooperation with the main memory 25.

The information processing program 24 may be stored in a computer-readable storage medium 31, and the processor 26 may read the information processing program 24 stored in the storage medium 31.

Examples of the storage medium 31 include, but are not limited to, a compact disc-read only memory (CD-ROM), a digital versatile disc (DVD), and a universal serial bus (USB) memory, which are physical portable storage media. A semiconductor memory such as a flash memory or a hard disk drive may be used as the storage medium 31. These storage media 31 are not temporal storage media such as carrier waves having no physical form.

Furthermore, the information processing program 24 may be stored in a device connected to a public network, the Internet, or a local area network (LAN), and the processor 26 may read and execute the information processing program 24.

The input device 27 is, for example, a keyboard and a mouse. The user can issue various instructions to the computing machinery 21 by operating these input devices when the information processing program 24 is executed.

The display device 28 is, for example, a liquid crystal display that displays various commands used by the user when the information processing program 24 is executed.

Hereinafter, a case where a plurality of the computing machineries 21 executes the information processing program 24 will be described as an example, but the various processes and functions described later may be implemented by the target machine 10 (see FIG. 1) executing the information processing program 24.

Program Architecture

Figure 6:
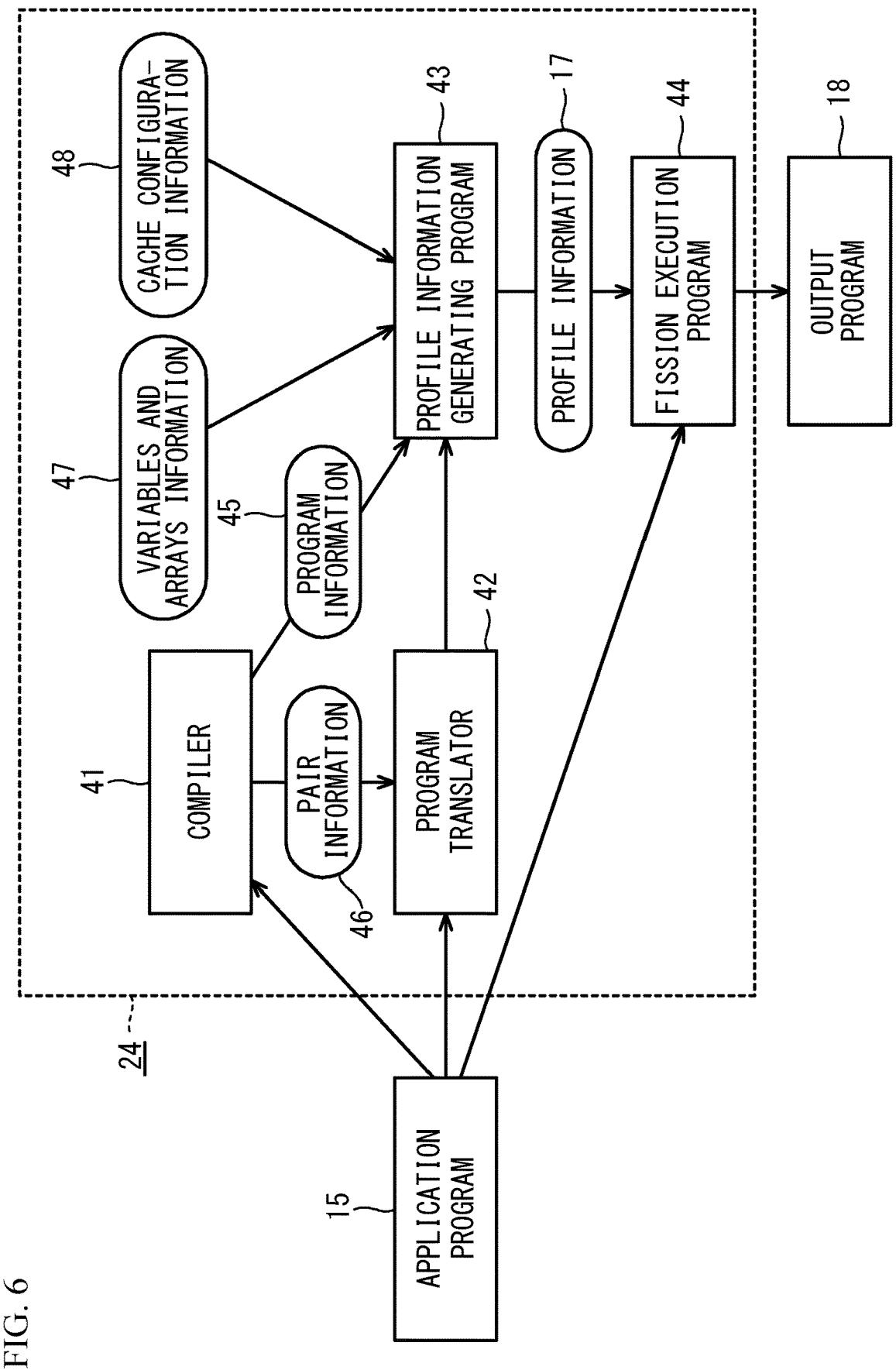
FIG. 6 is a configuration diagram of an information processing program in accordance with the embodiment.

FIG. 6 is a configuration diagram of the information processing program 24 in accordance with the present embodiment. As illustrated in FIG. 6, the information processing program 24 includes a compiler 41, a program translator 42, a profile information generating program 43, and a fission execution program 44.

The compiler 41 outputs, as program information 45, various information included in the application program 15.

FIG. 7 illustrates the program information 45 output by the compiler 41 based on the application program 15 of FIG. 3.

As illustrated in FIG. 7, the program information 45 includes respective start addresses of arrays A, B, and C included in the application program 15. The program information 45 also includes dimension information of the arrays A, B, and C and the number of bytes per array element.

Reference back to FIG. 6, the program translator 42 generates the profile information generating program 43 by rewriting the application program 15. When generating the profile information generating program 43, the program translator 42 uses pair information 46.

FIG. 8 illustrates an example of the pair information 46. The pair information 46 includes the ordered pairs included in the profile information 17 (see FIG. 3). As described above, the ordered pair is a pair of the statements having the execution result when executed in the loop identical to the execution result in the application program 15.

For example, in the example of the application program 15 in FIG. 3, four pairs (S1, S2), (S1, S3), (S2, S3), and (S3, S2) are stored as the ordered pairs in the pair information 46. Additionally, in this example, the number for uniquely identifying each ordered pair is stored in the pair information 46.

The profile information 17 may be generated by the compiler 41 analyzing the dependence relationships among the statements, or may be generated by the user.

Reference back to FIG. 6, the profile information generating program 43 is an example of a counting program, and generates the aforementioned profile information 17.

When generating the profile information 17, the profile information generating program 43 references the program information 45, variable and array information 47, and cache configuration information 48.

Figure 9:
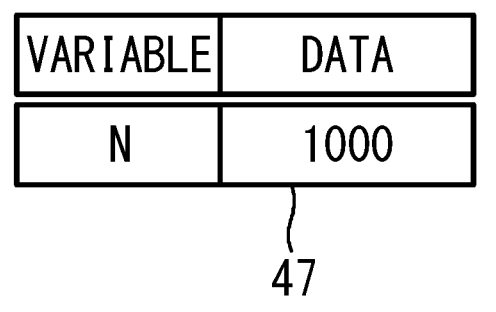

FIG. 9 illustrates an example of the variable and array information 47 when the application program 15 of FIG. 3 is used.

As illustrated in FIG. 9, a variable N is stored in the variable and array information 47. As seen from the application program 15 of FIG. 3, the variable N denotes the number of iterations of the loop 15a. In this application program 15, N elements are stored in each of the arrays A, B, and C. Thus, the variable N also denotes the number of dimensions of these arrays A, B, and C.

FIG. 10 illustrates an example of the cache configuration information 48. As illustrated in FIG. 10, the cache configuration information 48 includes the respective values of the associativity A, the block size B, and the number S of sets of the cache memory 14 of the target machine 10 (see FIG. 1).

Reference back to FIG. 6, using the profile information 17, the fission execution program 44 splits the loop 15a (see FIG. 3) of the application program 15 into a plurality of loops, and outputs the program after the fission as the output program 18.

Information Processing Method

Next, a description will be given of an overview of the process of the information processing method in accordance with the present embodiment implemented by the information processing apparatus 24 executing the information processing program 24.

Figure 11:
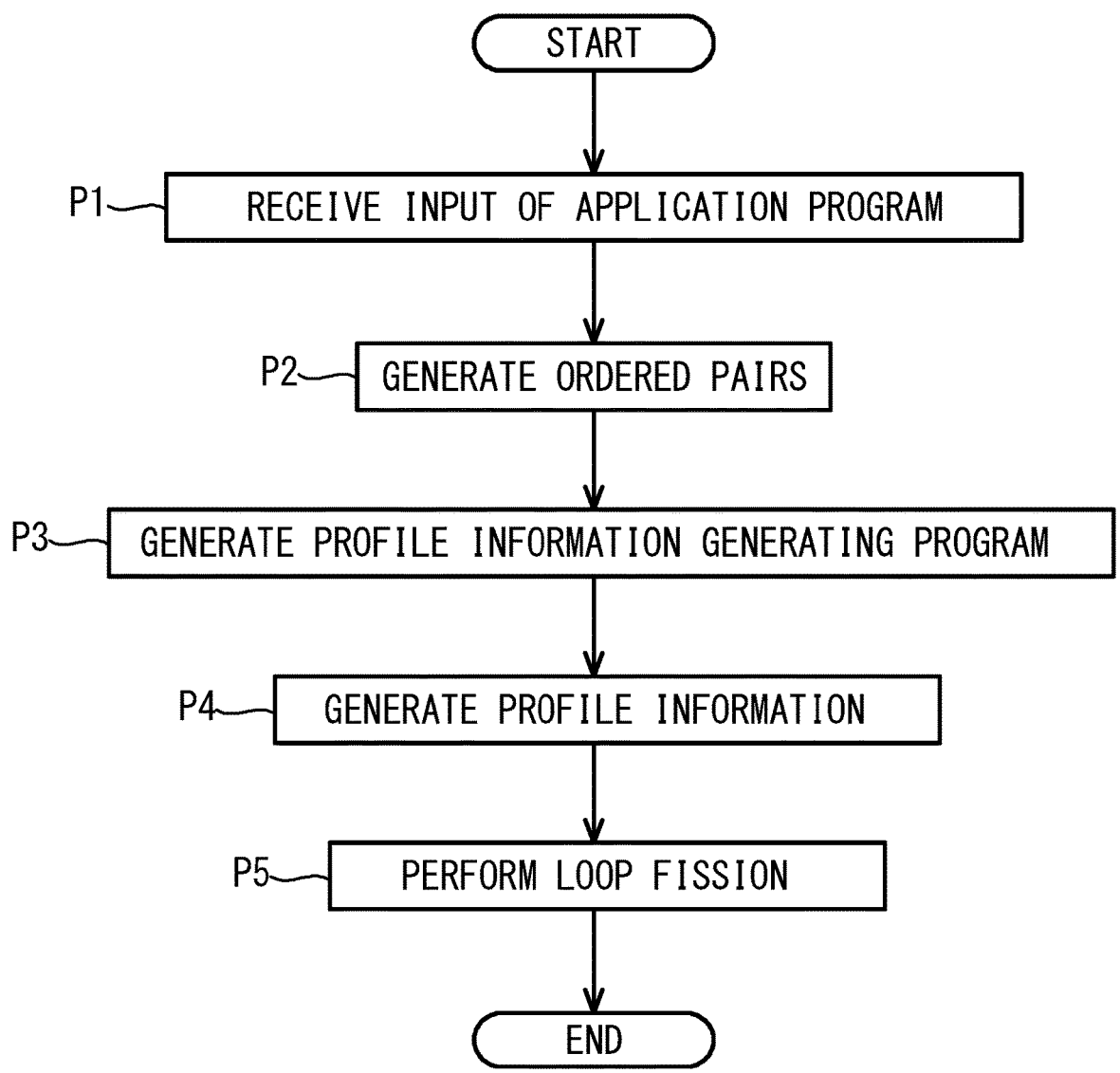
FIG. 11 is a flowchart of an information processing method in accordance with the embodiment.

FIG. 11 is a flowchart of the information processing method in accordance with the present embodiment.

First, in step P1, the information processing apparatus 20 receives the input of the application program 15.

Then, in step P2, the compiler 41 generates the pair information 46 based on the application program 15.

Then, in step P3, using the pair information 46, the program translator 42 generates the profile information generating program 43.

Then, in step P4, the profile information generating program 43 generates the profile information 17.

Subsequently, in step P5, the fission execution program 44 splits the loop of the application program 15 by using the profile information 17.

Functional Configuration

Next, the functional configuration of the information processing apparatus 20 in accordance with the present embodiment will be described.

Figure 12:
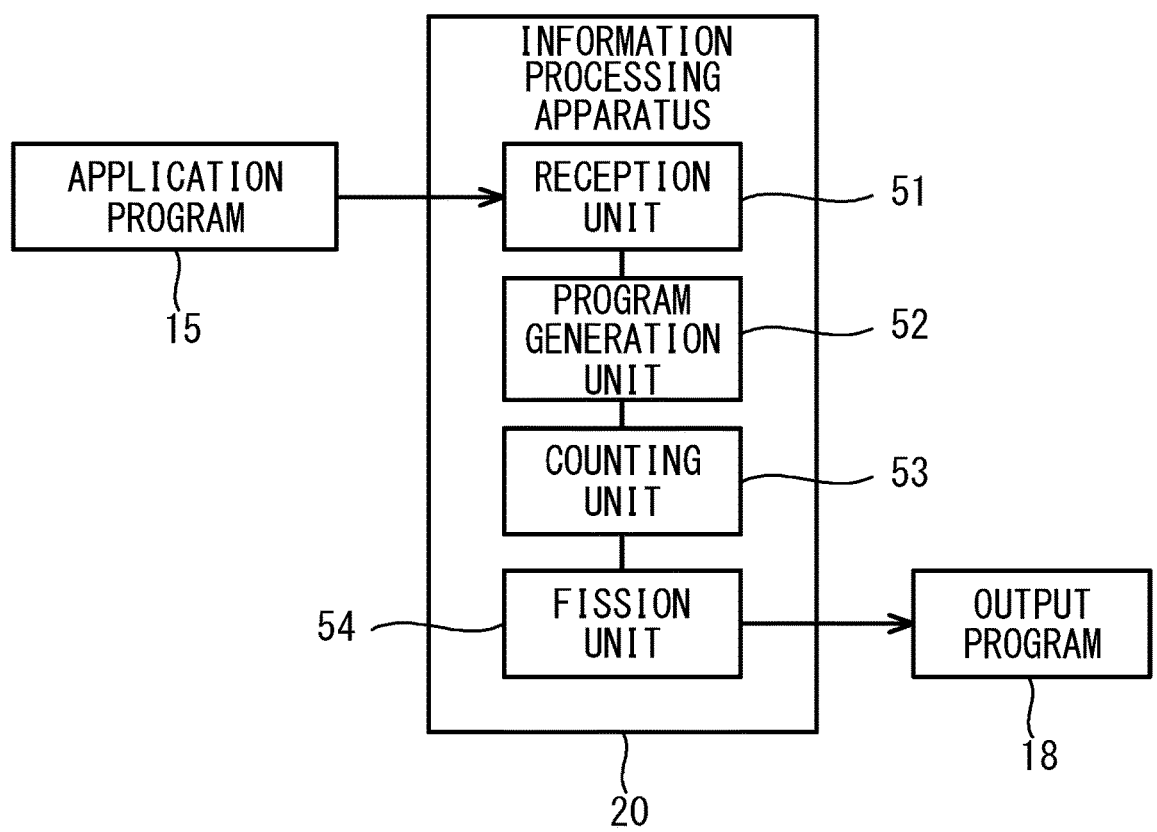
FIG. 12 is a functional block diagram illustrating the functions of the information processing apparatus in accordance with the embodiment.

FIG. 12 is a functional block diagram illustrating the functions of the information processing apparatus 20 in accordance with the present embodiment.

As illustrated in FIG. 12, the information processing apparatus 20 includes a reception unit 51, a program generation unit 52, a counting unit 53, and a fission unit 54.

The reception unit 51 and the program generation unit 52 are implemented by the processor 26 and the main memory 25 (see FIG. 5) executing the program translator 42 in cooperation with each other.

The reception unit 51 is a functional block for receiving the input of the application program 15. The program generation unit 52 is a functional block for generating the profile information generating program 43 based on the input application program 15.

On the other hand, the counting unit 53 is implemented by the processor 26 and the main memory 25 (see FIG. 5) executing the profile information generating program 43 in cooperation with each other. The counting unit 53 counts the number of cache misses and the number of cache hits that are expected when the loop is executed for each ordered pair of the statements included in the application program 15, and writes the results in the profile information 17 (see FIG. 3).

When a plurality of the computing machineries 21 each corresponding to the set identifier s as illustrated in FIG. 4 is used, the counting unit 53 is implemented in each of these computing machineries 21. In this case, each counting unit 53 counts the number of cache misses and the number of cache hits in the set identifiers of its own device in parallel.

The fission unit 54 is a functional block implemented by the processor 26 and the main memory 25 (see FIG. 5) executing the fission execution program 44 in cooperation with each other. The fission unit 54 splits the loop 15a into a plurality of the loops 15b and 15c based on the number of cache misses and the number of cache hits included in the profile information 17.

Process by the Program Generation Unit 52

Next, a description will be given of the program generation unit 52. The program generation unit 52 generates the profile information generating program 43 by rewriting the application program 15. Here, a source program written in C is generated as the profile information generating program 43. The following describes the generation method of the profile information generating program 43.

Figure 13:
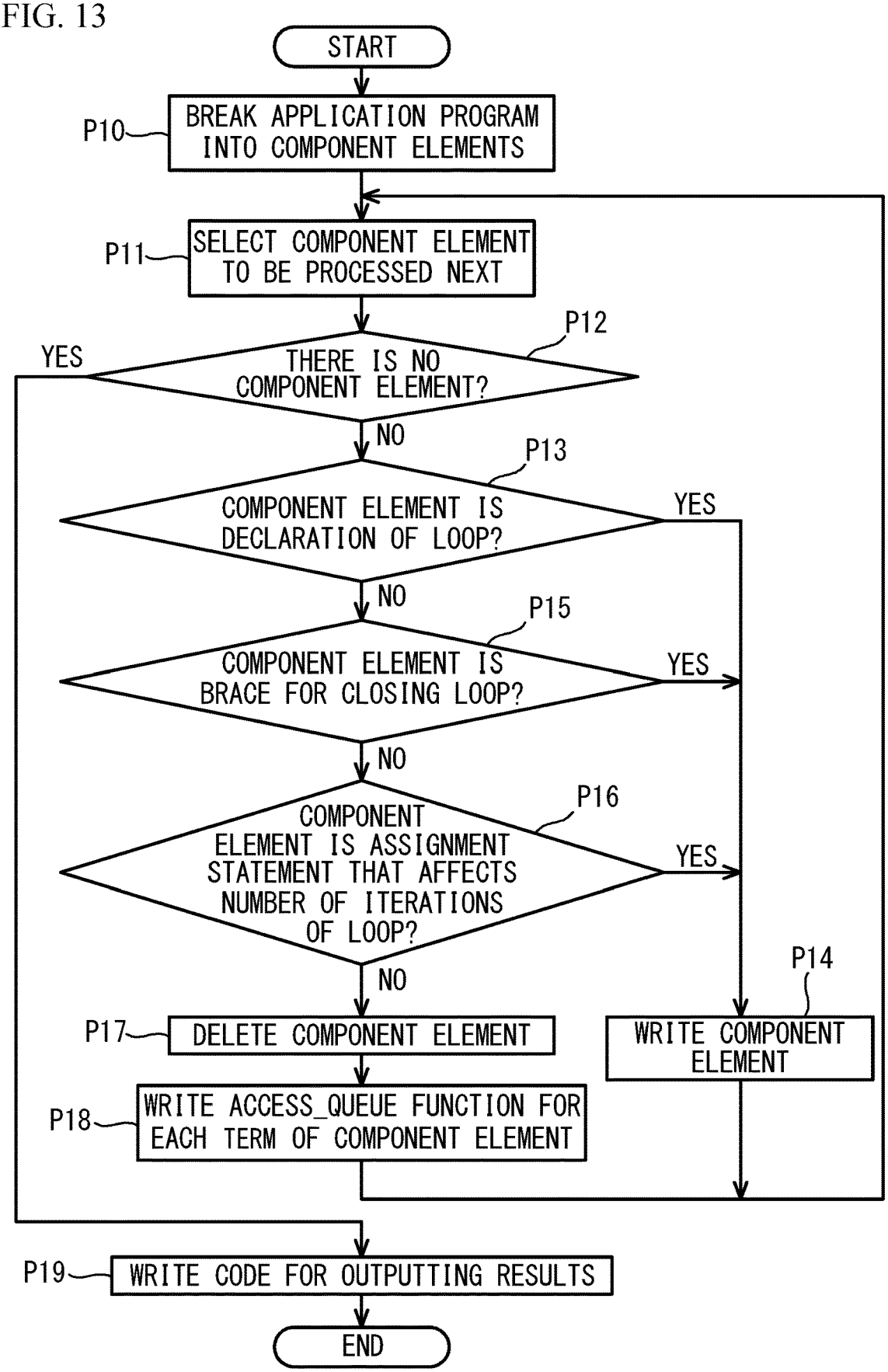
FIG. 13 is a flowchart of a method of generating a profile information generating program in accordance with the embodiment.

FIG. 13 is a flowchart of a generation method of the profile information generating program 43 in accordance with the present embodiment.

Hereinafter, a case where the profile information generating program 43 is generated by using the application program 15 of FIG. 3 will be described.

First, in step P10, the program generation unit 52 breaks the application program 15 into a plurality of component elements E1 to E5.

FIG. 14 is a schematic diagram illustrating the component elements E1 to E5. The component elements E1 to E5 are elements obtained by breaking the source code of the application program 15 into meaningful pieces. For example, the statements S1 to S3 each ending with a semicolon ";" becomes the component elements E2 to E4, respectively. Moreover, the declaration of the loop such as the component element E1 also becomes the component element. The declaration of the loop includes a for statement, and the initialization expression "i=0", the continuation condition expression "i<N", and the update expression "i++" for the for statement, and the opening brace "{". The closing brace "}" that means the end of the loop becomes the component element E5.

Then, in step P11, the component element to be processed next is selected from among the component elements E1 to E5. Here, E1, E2, E3, E4, and E5 are sequentially selected in this order.

Next, in step P12, the program generation unit 52 determines whether there is no component element to be processed next. When the determination is NO, the process proceeds to step P13.

In step P13, the program generation unit 52 determines whether the component element to be processed is the declaration of the loop. For example, the component element E1 is determined to be the declaration of the loop (YES).

When the determination is YES, the process proceeds to step P14, and the program generation unit 52 writes the component element selected in step P11 in the profile information generating program 43. For example, the component element E1 is written in the profile information generating program 43.

On the other hand, when the determination in step P13 is NO, the process proceeds to step P15.

In step P15, the program generation unit 52 determines whether the component element is the brace for closing the loop. For example, the component element E5 is determined to be the brace for closing the loop (YES).

When the determination in step P15 is YES, the process proceeds to step P14, and the program generation unit 52 writes the component element in the profile information generating program 43. For example, the component element E5 is written in the profile information generating program 43.

On the other hand, when the determination is NO in step P15, the process proceeds to step P16.

In step P6, the program generation unit 52 determines whether the component element selected in step P11 is an assignment statement that affects the number of iterations of the loop. For example, in the application program 15 illustrated in FIG. 3, the variable "N" is the number of iterations of the loop. When there is an assignment statement that changes the variable "N", the determination in step P16 becomes YES. In this case, in step P14, the assignment statement is written in the profile information generating program 43.

In the example of FIG. 3, since there is no assignment statement that changes the variable "N", the determination becomes NO. When the determination is NO, the process proceeds to step P17.

In step P17, the component element to be processed is deleted from the application program 15. For example, the component elements E2 to E4 in FIG. 14 are deleted from the application program 15.

Then, in step P18, using the component element selected in step P11, the program generation unit 52 generates the function ACCESS_QUEUE(c, order, s, a). The program generation unit 52 then writes the function ACCESS_QUEUE(c, order, s, a) in the profile information generating program 43.

The function ACCESS_QUEUE(c, order, s, a) is generated for each term such as an array or the like included in each component element. For example, two arrays A and X are included as terms in the component element E2. Thus, the function ACCESS_QUEUE(c, order, s, a) is generated for each of these arrays A and X.

The function ACCESS_QUEUE(c, order, s, a) is a library function for calling the function ACCESS(c, s, a), which will be described later, according to the value of an argument "order", and storing that call in a queue.

For example, when the "order" is "0", the function ACCESS_QUEUE(c, order, s, a) immediately calls the function ACCESS(c, s, a) inside the function ACCESS_QUEUE(c, order, s, a).

On the other hand, when the "order" is "1", the function ACCESS_QUEUE(c, order, s, a) stores that call in a queue. After finishing the execution of the subsequent function ACCESS_QUEUE of which the "order" is "0", the function ACCESS_QUEUE(c, order, s, a) calls the function ACCESS (c, s, a) stored in the queue.

The first argument "c" of the function ACCESS_QUEUE (c, order, s, a) is an identifier for identifying the cache memory 14 to be simulated. In the present embodiment, it is assumed that different cache memories 14 are used for respective ordered pairs (see FIG. 8). Thus, the number for the ordered pair (see FIG. 8) corresponds one-to-one with the first argument "c".

Moreover, the second argument "s" is the set identifier of the cache memory 14. The third argument "a" is the beginning address of the array included in the component element selected in step P11.

The process in step P18 will be described in detail using the component elements E2 to E4 as examples. First, a case where the component element E2 is the object to be processed will be described.

FIG. 15 is a schematic diagram illustrating the functions ACCESS_QUEUE(c, order, s, a) generated when the statement S1, which is the component element E2, is processed in step P18.

The function ACCESS_QUEUE(c, order, s, a) is generated as many as the total number of combinations of the two array elements A[i] and X[i] included in the statement S1 and two ordered pairs (S1, S2) and (S1, S3) including the statement S1. Thus, in this example, four (=2×2) functions ACCESS_QUEUE(c, order, s, a) are generated.

The arguments of these functions ACCESS_QUEUE(c, order, s, a) are determined as follows.

The identifier such as "cache1" or "cache2" for identifying the cache memory 14 to be simulated is set to the first argument "c". Here, it is assumed that the target machine 10 (see FIG. 1) includes four cache memories 14, and these cache memories 14 are identified by identifiers: cache1 to chache4.

The second argument "order" is determined depending on which of the first component and the second component of the ordered pair is the statement S1. Hereinafter, when the statement is in the first component, the "order" is set at "0", whereas when the statement is in the second component, the "order" is set at "1".

In both the ordered pairs (S1, S2) and (S1, S3), the statement S1 is in the first component. Thus, in the example of FIG. 15, the "order" is "0".

The third argument "s" is the set identifier for which the number of cache misses and the number of cache hits are to be measured. The set identifier is passed to the function ACCESS_QUEUE(c, order, s, a) when the profile information generating program 43 is executed, and thus is not set at this stage.

Each of the address(X[i]) and the address(A[i]) of the two array elements A[i] and X[i] included in the statement S1 is set to the fourth argument "a". For example, when the profile information generating program is written in C as in this example, the address can be set to the fourth argument with an & operator.

Next, the case where the component element E3 is processed in step P18 will be described.

FIG. 16 is a schematic diagram illustrating the functions ACCESS_QUEUE(c, order, s, a) generated when the statement S2, which is the component element E3, is processed in step P18.

In this case, the function ACCESS_QUEUE(c, order, s, a) is generated as many as the total number of combinations of three array elements B[i], A[i], and X[i+4] included in the statement S2 and three ordered pairs (S1, S2), (S2, S3), and (S3, S2) including the statement S2. Thus, nine (=3×3) functions ACCESS_QUEUE(c, order, s, a) are generated.

Additionally, the arguments of these nine functions ACCESS_QUEUE(c, order, s, a) are determined in the same manner as in the example of FIG. 15.

For example, the first argument of the first function ACCESS_QUEUE(cache1, 1, s, address(A[i])) becomes "cache1" corresponding to "1" that is the number for the ordered pair (S1, S2). Since the statement S2 is in the second component of the ordered pair (S1, S2), the second argument is "1". The fourth argument is the address(A[i]) that is the address of the array element A[i] included in the statement S2.

Next, the case where the component element E4 is processed in step P18 will be described.

FIG. 17 is a schematic diagram illustrating the functions ACCESS_QUEUE(c, order, s, a) generated when the statement S3, which is the component element E4, is processed in step P18.

In this case, the function ACCESS_QUEUE(c, order, s, a) is generated as many as the total number of combinations of three array elements C[i], A[i], and X[i+8] included in the statement S3 and three ordered pairs (S1, S3), (S2, S3), and (S3, S2) including the statement S3. Thus, nine (=3×3) functions ACCESS_QUEUE are generated.

Reference back to FIG. 13, after finishing step P18 as described above, the process returns to step P11. Then, in step P12, when it is determined that there is no component element to be processed (YES), the process proceeds to step P19.

In step P19, a code for outputting the results such as the number of cache hits and the number of cache misses is written in the profile information generating program 43.

FIG. 18 is a schematic diagram illustrating an example of the code output in step P19.

In this example, four functions DUMP(c, s) each corresponding to the corresponding one of cache1 to cache4 are output.

The function DUMP(c, s) receives the first argument "c" of the function ACCESS_QUEUE(c, order, s, a) as its first argument, and also receives the set identifier "s" of the cache memory as its second argument. In this example, one of cache1 to cache4 is set as the first argument "c". The set identifier "s", which is the second argument, is passed to the function DUMP(c, s) when the profile information generating program 43 is executed, and thus is not set at this stage.

Execution of this function DUMP(c, s) causes the profile information 17 of FIG. 3 to be output. For example, when the function DUMP(cache1, s) is executed, the number of cache hits and the number of cache misses when the ordered pair (S1, S2) with the number "1" is executed in one loop are output.

Additionally, when the function DUMP(cache2, s) is executed, the number of cache hits and the number of cache misses when the ordered pair (S1, S3) with the number "2" is executed in one loop are output. Similarly, the execution of the function DUMP(cache3, s) causes the results when the ordered pair (S2, S3) with the number "3" is executed in one loop to be output, and the execution of the function DUMP(cache4, s) causes the results when the ordered pair (S3, S2) with the number "4" is executed in one loop to be output. The process of the flowchart in FIG. 13 finishes as described above.

FIG. 19 is a schematic diagram illustrating an example of the profile information generating program 43 conclusively obtained by rewriting the application program 15 in the aforementioned manner.

As illustrated in FIG. 19, in the profile information generating program 43, a loop with a for statement is written with the component element E1 and the component element E5. When the profile information generating program 43 is executed, the value of the variable "N" denoting the number of iterations of the loop needs to be determined. The value of the variable "N" can be determined from the variable and array information 47 illustrated in FIG. 9.

Then, the functions ACCESS_QUEUE(c, order, s, a) generated in step P18 are written inside the loop. Furthermore, the functions DUMP(c, s) are written after the loop process.

As described above, the function ACCESS_QUEUE(c, order, s, a) calls the function ACCESS(c, s, a) inside the function ACCESS_QUEUE(c, order, s, a). Whether that call is immediately executed or stored in a queue is determined depending on the value of the second argument "order" of the function ACCESS_QUEUE(c, order, s, a).

FIG. 20 illustrates an equivalent program 60 in which a plurality of functions ACCESS(c, s, a) is arranged such that the timing of call of the functions ACCESS(c, s, a) is the same as that in the profile information generating program 43 in FIG. 19.

The equivalent program 60 is a C source program that can obtain the execution result identical to the execution result of the profile information generating program 43.

In the equivalent program 60, a plurality of the functions ACCESS(c, s, a) is written inside of the loop 60x with a for statement. Each of the functions ACCESS(c, s, a) is written inside the corresponding one of the functions ACCESS_QUEUE(c, order, s, a) in the profile information generating program 43, and receives the arguments "c", "s", and "a" from the corresponding function ACCESS_QUEUE(c, order, s, a).

The order of appearance of the functions ACCESS (c, s, a) is the same as the order obtained by sorting the functions ACCESS_QUEUE(c, order, s, a) in the profile information generating program 43 by the first argument "c" and the second argument "order".

Accordingly, the functions ACCESS(c, s, a) are split into a plurality of counting processes 60a to 60d for the ordered pairs (S1, S2), (S1, S3), (S2, S3), and (S3, S2), respectively.

The counting process 60a counts the number of cache hits and the number of cache misses that are expected when only the ordered pair (S1, S2) with the number "1" of the pair information 46 (see FIG. 8) is executed in one loop 15a.

The counting process 60b counts the number of cache hits and the number of cache misses that are expected when only the ordered pair (S1, S3) with the number "2" is executed in one loop 15a.

Similarly, the counting process 60c counts the number of cache hits and the number of cache misses that are expected when only the ordered pair (S2, S3) with the number "3" is executed in one loop 15a, and the counting process 60d counts the number of cache hits and the number of cache misses that are expected when only the ordered pair (S3, S2) with the number "4" is executed in one loop 15a.

As described above, when the dependence relationships among the statements S1, S2, and S3 are ignored, the six pairs (S1, S2), (S2, S1), (S1, S3), (S3, S1), (S2, S3), and (S3, S2) are obtained. Among these pairs, the ordered pairs (S1, S2), (S1, S3), (S2, S3), and (S3, S2) have the execution results when executed in the loop 15a identical to those in the application program 15.

In the present embodiment, the program generation unit 52 writes only the counting processes 60a to 60d corresponding to these four ordered pairs in the profile information generating program 43. In addition, the program generation unit 52 does not write the process for counting the number of cache hits and the number of cache misses for the pairs of the statements other than the four ordered pairs in the profile information generating program 43.

This eliminates the need for counting the number of cache hits and the like unnecessarily for pairs of the statements having the execution results different from those in the application program 15, and thereby, reduces the execution time of the profile information generating program 43.

In addition, by writing the counting processes 60a to 60d in one loop 60x, the execution results of the counting processes 60a to 60d can be obtained collectively when the execution of the loop 60x finishes. As a result, when the execution of the loop 60x finishes, the numbers of cache hits and the numbers of cache misses for the order pairs (S1, S2), (S1, S3), (S2, S3), and (S3, S2) can be obtained collectively, and these numbers can be efficiently obtained.

Next, the function of the counting unit 53 in FIG. 12 will be described. The functions of the counting unit 53 are implemented by the main memory 25 and the processor 26 executing the profile information generating program 43 (see FIG. 19) including the function ACCESS(c, s, a) in cooperation with each other.

The function ACCESS(c, s, a) is a function for counting the number of cache hits and the number of cache misses, and simulating the replacement of the data in the cache memory 14. The cache memory 14 subject to the simulation is specified by the first argument "c". In addition, the second argument "s" is the set identifier subject to the simulation in the cache memory 14. Finally, the third argument "a" is the address of the data.

Next, the processing details of the function ACCESS(c, s, a) will be described.

Figure 21:
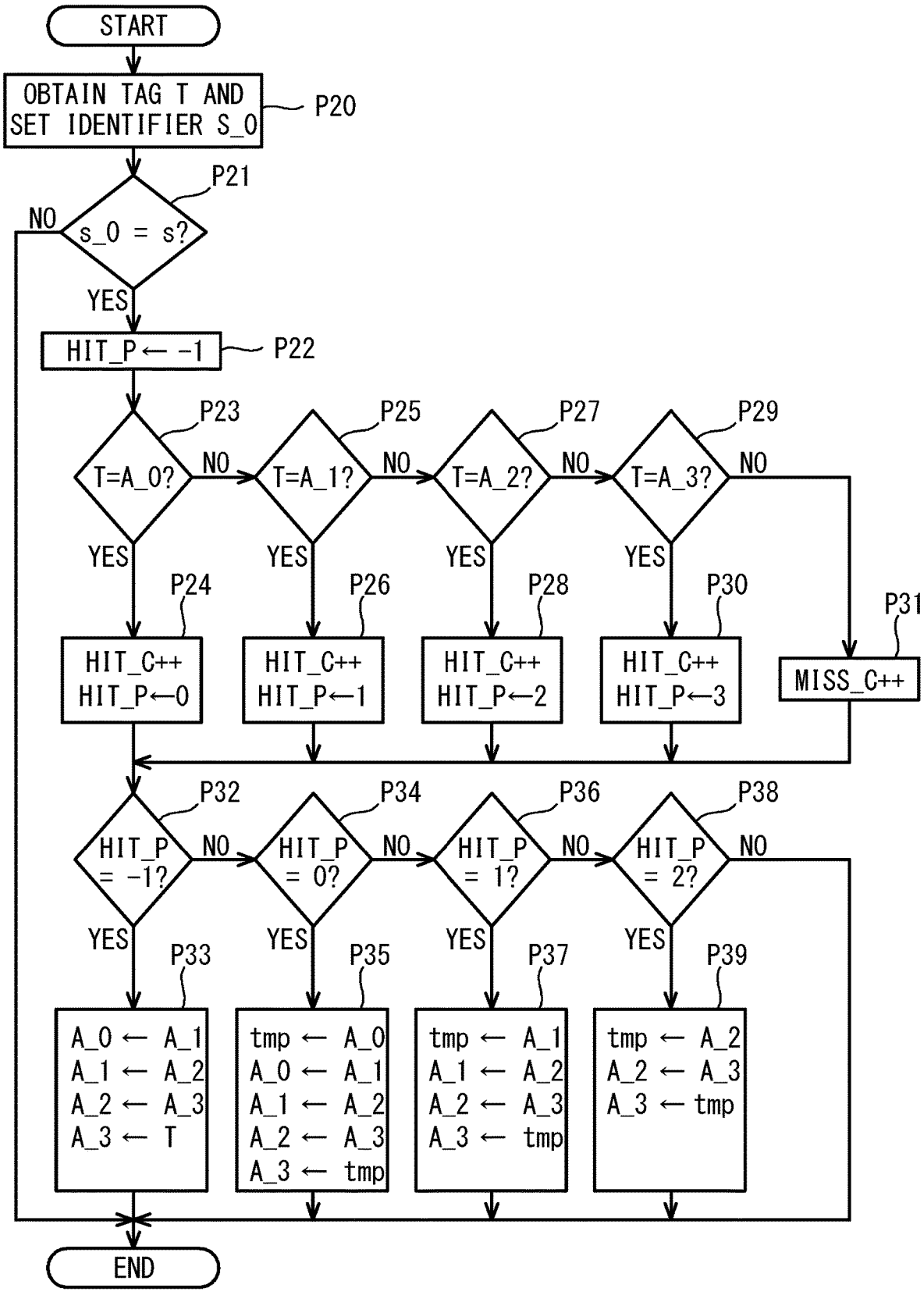
FIG. 21 is a flowchart illustrating processing details of a function ACCESS in accordance with the embodiment.

FIG. 21 is a flowchart illustrating the processing details of the function ACCESS(c, s, a).

The function ACCESS(c, s, a) reads the setting file including the program information 45, the variable and array information 47, and the cache configuration information 48 at the time of execution.

For example, the function ACCESS(c, s, a) obtains the associativity A, the number S of sets, and the block size B from the cache configuration information 48 illustrated in FIG. 10. Hereinafter, a case where the associativity A is four will be described, but the cache memory 14 having the associativity other than four may be simulated.

First, in step P20, the counting unit 53 obtains the tag T from the address "a" that is the third argument. For example, the counting unit 53 obtains the high 2 bits of the address "a" as the tag T as illustrated in FIG. 2B.

In addition, the counting unit 53 obtains the set identifier $s\_0$ corresponding to the address "a". The set identifier $s\_0$ can be obtained from the aforementioned expression (2) by using the address "a", the number S of sets, and the block size B.

Next, in step P21, the counting unit 53 determines whether the second argument "s" is equal to the set identifier $s\_0$. When the determination is NO, the process ends.

On the other hand, when the determination is YES, the process proceeds to step P22. In step P22, the counting unit 53 initializes the variable HIT_P to "−1".

The variable HIT_P is an integer-valued variable for identifying which one of four blocks 14b stores the data with the address "a". In this example, when it turns out that the data with the address "a" exists in one of the four blocks 14b in the latter step, one of the values "0" to "3" corresponding to respective blocks 14b is set to the variable HIT_P.

In the case of HIT_P=−1, the data with the address "a" does not exist in any of the four blocks 14b.

Then, in step P23, the counting unit 53 determines whether the tag T is equal to the variable $A\_0$. The variables $A\_0$ to $A\_3$ represent the tags of the blocks 14b with the variable HIT_P of 0 to 4, respectively.

To simulate the replacement of the data in the cache memory 14 by the least recently used (LRU) method, here, it is assumed that the data is stored in the blocks 14b corresponding to the variables $A\_0$ to $A\_3$ in order of the access time from the oldest. Thus, the data having the oldest access time is stored in the block 14b corresponding to the variable $A\_0$, whereas the data having the latest access time is stored in the block 14b corresponding to the variable $A\_3$.

Prior to execution of this flowchart, all the variables $A\_0$ to $A\_3$ are initialized to "−1".

When the determination is YES in step P23, this means that the data with the address "a" exists in the block 14b corresponding to the variable $A\_0$.

In this case, the process proceeds to step P24, and the counting unit 53 sets "0" to the variable HIT_P. Additionally, the counting unit 53 increments the value of the variable HIT_C by one. The variable HIT_C is an integer-valued variable for storing the number of cache hits. Prior to the execution of this flowchart, the variable HIT_C is initialized to 0.

On the other hand, when the determination is NO in step P23, the process proceeds to step P25. In step P25, the counting unit 53 determines whether the tag T is equal to the variable $A\_1$.

When the determination is YES, this means that the data with the address "a" exists in the block 14b corresponding to the variable $A\_1$.

In this case, the process proceeds to step P26, and the counting unit 53 sets 1 to the variable HIT_P. Additionally, the counting unit 53 increments the value of the variable HIT_C by one.

On the other hand, when the determination is NO in step P25, the process proceeds to step P27.

In step P27, the counting unit 53 determines whether the tag T is equal to the variable $A\_2$. When the determination is YES, the process proceeds to step P28, and the counting unit 53 sets "2" to the variable HIT_P and increments the value of the variable HIT_C by one.

On the other hand, when the determination is NO in step P27, the process proceeds to step P29.

In step P29, the counting unit 53 determines whether the tag T is equal to the variable A_3. When the determination is YES, the process proceeds to step P30, and the counting unit 53 sets "3" to the variable HIT_P and increments the value of the variable HIT_C by one.

On the other hand, when the determination is NO in step P29, the process proceeds to step P31.

When the tag T is not equal to any of the variables A_0 to A_3 and the data with the address "a" does not exist any of four cache blocks, the determination in step P29 becomes NO.

Thus, in step P31, the counting unit 53 increments an integer-valued variable MISS_C for storing the number of cache misses by one. Note that the variable MISS_C is initialized to 0 prior to the execution of this flowchart.

Additionally, the process of changing the value of the variable HIT_P is not performed between the time when "−1" is set to the variable HIT_P in step P22 and the time when step P31 is executed. Thus, the value of the variable HIT_P when step P31 is completed is "−1".

After completing step P24, P26, P28, P30, or P31 in the aforementioned manner, the process proceeds to step P32.

In step P32 and thereafter, the case where the data in the cache memory 14 is replaced by the LRU method is simulated.

First, in step P32, the counting unit 53 determines whether the variable HIT_P is equal to "−1".

When the determination is YES, this means that the data with the address "a" does not exist in any of four cache blocks as described above.

In this case, the process proceeds to step S33, and the counting unit 53 assigns the variables in the order of A_0←A_1, A_1←A_2, A_2←A_3, and A_3←T. By assigning variables in this order, the variables A_0 to A_3 no longer hold the value of A_0 before the assignment. Thus, the eviction of the data corresponding to A_0 from the cache memory can be simulated. Moreover, by assigning the value of T to the variable A_3 at the end, the case where the newest data in the cache memory is stored in the block 14b corresponding to the variable A_3 can be simulated.

The process ends after the values of the variables A_0 to A_3 are changed in the aforementioned manner.

On the other hand, when the determination is NO in step P32, the process proceeds to step P34.

In step P34, the counting unit 53 determines whether the variable HIT_P is equal to "0".

When the determination is YES, this means that the data with the address "a" exists in the block 14b corresponding to the variable A_0.

In this case, the process proceeds to step P35, and the counting unit 53 assigns the variables in the order of tmp←A_0, A_0←A_1, A_1←A_2, A_2←A_3, and A_3←tmp. Note that "tmp" is a temporal variable for assignment.

Accordingly, since the value of the variable A_0 before the assignment is assigned to the variable A_3 through the above process, the case where the data that is most recently accessed exists in the block 14b corresponding to the variable A_3 can be simulated.

The process ends after the values of the variables A_0 to A_3 are changed in the aforementioned manner.

When the determination is NO in step P34, the process proceeds to step P36.

In step P36, the counting unit 53 determines whether the variable HIT_P is equal to "1".

When the determination is YES, this means that the data with the address "a" exists in the block 14b corresponding to the variable A_1.

In this case, the process proceeds to step P37, and the counting unit 53 assigns the variables in the order of tmp←A_1, A_1←A_2, A_2←A_3, and A_3←tmp.

Since the value of the variable A_1 before the assignment is assigned to the variable A_3 through the above process, the case where the data that is most recently accessed exists in the block 14b corresponding to the variable A_3 can be simulated.

The process ends after the values of the variables A_1 to A_3 are changed in the aforementioned manner.

When the determination is NO in step P36, the process proceeds to step P38.

In step P38, the counting unit 53 determines whether the variable HIT_P is equal to "2".

When the determination is YES, this means that the data with the address "a" exists in the block 14b corresponding to the variable A_2.

In this case, the process proceeds to step P39, and the counting unit 53 assigns the variables in the order of tmp←A_2, A_2←A_3, and A_3←tmp.

Since the value of the variable A_2 before assignment is assigned to the variable A_3 through the above process, the case where the data that is most recently accessed exists in the block 14b corresponding to the variable A_3 can be simulated.

The process ends after the values of the variables A_2 and A_3 are changed in the aforementioned manner.

On the other hand, when the determination is NO in step S38, this means that the variable HIT_P is equal to "3", and the data with the address "a" exists in the block 14b corresponding to the variable A_3. As described above, the variable A_3 corresponding to the block 14b having the latest access time. Thus, in this case, the value of the variable A_3 does not need to be changed, and the process ends.

In the aforementioned manner, the process of the function ACCESS(c, s, a) ends.

When the equivalent program 60 (see FIG. 20) in which such a function ACCESS(c, s, a) is written, the number of cache hits in the set identifier "s" is stored in the variable HIT_C, and the number of cache misses is stored in the variable MISS_C.

The values of these variables HIT_C and MISS_C are output as the number of cache hits and the number of cache misses by the function DUMP(c, s). Accordingly, the profile information 17 illustrated in FIG. 3 can be obtained.

The embodiment described above generates the profile information generating program 43 by rewriting the application program 15 as illustrated in FIG. 6. The execution of the profile information generating program 43 causes the counting unit 53 to count the number of cache hits and the number of cache misses, and these values are written in the profile information 17.

The number of cache hits and the number of cache misses that are written in the profile information 17 are the values expected when the loop 15a is executed for each ordered pair of two statements selected from the statements S1 to S3. Thus, when the fission unit 54 splits the loop 15a such that only the ordered pair having the largest number of cache hits among the ordered pairs is included one loop, the replacement of the data in the cache memory 14 is reduced. As a result, the cache memory 14, which is a hardware resource, can be efficiently used, and the execution speed of the application program 15 in the target machine 10 (see FIG. 1) is improved.

Moreover, the present embodiment generates the profile information generating program 43 from the application program 15 without using the CPU simulator or the target machine 10 that has difficulty in obtaining the number of cache misses for each ordered pair of the statements.

Therefore, the number of cache hits and the number of cache misses for each ordered pair of two of the statements S1 to S3 included in the application program 15 can be easily counted as described above.

The method of loop fission by the fission unit 54 is not limited to the above method. FIG. 22A illustrates the profile information 17 for describing another example of the loop fission.

In this example, the number of cache hits for the ordered pair (S1, S2) and the number of cache hits for the ordered pair (S1, S3) are the same, and 500. However, the number of cache misses for the ordered pair (S1, S2) is 20, whereas the number of cache misses for the ordered pair (S1, S3) is 10.

FIG. 22B illustrates the output program 18 obtained by the fission unit 54 performing the loop fission in this case.

In this case, the fission unit 54 performs the loop fission such that only the ordered pair (S1, S3) having the smallest number of cache misses among the ordered pairs (S1, S2) and (S1, S3) having the same number of cache hits is included in one loop 15b.

This reduces the number of cache misses when the loop 15b is executed compared with the case where the ordered pair different from the ordered pair (S1, S3) is included in the loop 15b.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An information processing apparatus comprising:
a memory; and
a processor coupled to the memory and configured to:
receive input of an input program in which a plurality of statements is written in a loop;
generate a counting program for causing a computing machinery to execute a process of counting the number of cache misses and the number of cache hits that are expected when the loop is executed for each of pairs of the statements by rewriting the input program;
write a counting process in the loop, the counting process counting the number of cache misses and the number of cache hits for each of the pairs; and
split the loop into a plurality of loops based on the number of cache misses and the number of cache hits counted in the process.

2. The information processing apparatus according to claim 1, wherein the processor is configured not to write the process for a pair having an execution result, when executed in the loop, different from an execution result in the input program in the counting program.

3. The information processing apparatus according to claim 1, wherein
the computing machinery is provided in plural corresponding to a plurality of set identifiers of a cache memory of which the number of cache misses and the number of cache hits are to be counted, and
each of the computing machineries counts the number of cache misses and the number of cache hits in the corresponding set identifier in parallel.

4. The information processing apparatus according to claim 1, wherein the processor is configured to split the loop such that a pair having the largest number of cache hits among the pairs is included in one loop.

5. The information processing apparatus according to claim 1, wherein the processor is configured to split the loop such that a pair having the smallest number of cache misses among the pairs having the same number of cache hits is included in one loop.

6. An information processing method implemented by a computer, the information processing method comprising:
receiving input of an input program in which a plurality of statements is written in a loop;
generating a counting process for causing a computing machinery to execute a process of counting the number of cache misses and the number of cache hits that are expected when the loop is executed for each of pairs of the statements by rewriting the input program;
writing a counting process in the loop, the counting process counting the number of cache misses and the number of cache hits for each of the pairs; and
splitting the loop into a plurality of loops based on the number of cache misses and the number of cache hits counted in the process of counting.

* * * * *